United States Patent [19]

Maier et al.

[11] 4,284,231

[45] Aug. 18, 1981

[54] DEVICE FOR DUCTING GAS IN A CENTRIFUGE BLOCK

[75] Inventors: Erwin Maier, Freising; Wilhelm Hirschmann, Friedberg; Eberhard Willeitner, Utting a. Ammersee, all of Fed. Rep. of Germany

[73] Assignee: Maschinenfabrik Augsburg-Nurnberg Aktiengesellschaft, Munich, Fed. Rep. of Germany

[21] Appl. No.: 43,806

[22] Filed: May 30, 1979

[30] Foreign Application Priority Data

Jun. 1, 1978 [DE] Fed. Rep. of Germany ....... 2824067

[51] Int. Cl.³ .............................................. B01D 21/26

[52] U.S. Cl. .................................................... 233/1 R

[58] Field of Search .................. 233/1 R, 1 A, 13, 16, 233/17, 18, DIG. 1

[56] References Cited

U.S. PATENT DOCUMENTS 4,053,104 10/1977 Penhasi et al. .................. 233/1 R X

FOREIGN PATENT DOCUMENTS 893647 4/1962 United Kingdom ...................... 233/18

*Primary Examiner*—Stanley N. Gilreath

*Attorney, Agent, or Firm*—Schwartz, Jeffrey, Schwaab, Mack, Blumenthal & Koch

[57] ABSTRACT

A device for ducting process gas in a centrifuge block, comprising a hood for sealingly covering the centrifuge block and for defining at least one duct for the process gas. One embodiment has tubes within the hood in communication with connecting openings in centrifuge housings of the centrifuge block. According to a second embodiment, the tubes may be serpentine. A third embodiment has ducts formed directly in the hood, while a fourth has partitioning walls within the space enclosed by the hood for dividing the space into ducts.

6 Claims, 5 Drawing Figures

DEVICE FOR DUCTING GAS IN A CENTRIFUGE BLOCK

BACKGROUND OF THE INVENTION

This invention relates to a device for ducting gas in a centrifuge block.

A centrifuge block consists of a plurality of individual centrifuges which, placed side by side and sometimes in several rows, are in communication with each other through tubing. For this purpose, use is normally made of tubes, particularly of metal tubes, connected to the various centrifuges by means of connecting openings. Ducting arrangements of this type require painstaking and extremely careful assembly for safe sealing to prevent the ingress of air into the partially evacuated system.

SUMMARY OF THE INVENTION

In a broad aspect, the present invention provides a device for ducting process gas in a centrifuge block capable of ensuring safe ducting of the process gas while maximally facilitating assembly of the apparatus.

It is a particular object of the present invention to provide a device consisting of a hood to seal and cover the centrifuge block and to form at least one gas duct.

The hood includes process ducts which are integrated into and/or joined to it, the individual ducts not requiring sealing from the atmosphere. The pressure within the hood, as it is in the centrifuge system, is below atmospheric, so that the pressure exerted by the atmosphere on the hood gives added safety to sealing areas. Sealing between the spaces of below atmospheric pressure and the atmosphere is thus reduced to the joint along the contour of the covering hood. Other sealing areas between various process ducts are arranged within the cover and are subjected to no more than moderate differences in pressure.

The device of the present invention provides another advantage in that the hood and process ducts are preassembled, so that in final assembly the covering hood is merely placed on the centrifuge block for appropriate subsequent joining by, for example, welding, and for making the connections to the three collector ducts. For this purpose, channels can be shaped directly in the hood to form process ducts when placed on suitable flanges connected to the rows of centrifuges. In a simple version, two such channels are provided for each row of centrifuges, where the remaining space enclosed by the hood serves as a third duct for feed gas.

In place of the channels shaped directly in the hood, sectional tubes of, for example, rectangular cross-section may be joined to the underside of the cover for communication with the separating chambers of the various centrifuges by means of transverse connections. It is again of advantage if no more than two tubes are provided for the gas fractions and if the remaining space below the cover is used for ducting the feed gas.

When such tubes are used, these may be serpentine shapes extending to all centrifuges of a block, and they may be round or rectangular in cross-section.

With the embodiment employing separate tubes, it is of advantage if the covering hood is made to rest on the tubes such that the pressure of the atmosphere above the hood will urge the tubes against the centrifuges. In this manner the tubes are placed and retained on the centrifuges, with interposed sealing elements but without need for fasteners.

In a further embodiment of the present invention, the space enclosed by the covering hood is partitioned to form separate chambers to serve as process ducts by means of partitioning elements such as discs, washers or cup-springs. This can be achieved, for example, by providing each centrifuge housing cover with a central connecting tube and providing the housing with a connecting tube extending above the cover. The remaining annulus is then separated, using annular washers, into three chambers, each communicating with the separating chamber through bores in the connecting tube.

BRIEF DESCRIPTION OF THE DRAWINGS

The accompanying drawings illustrate several embodiments of the present invention, in which.

THE PREFERRED EMBODIMENTS

Figure 1:
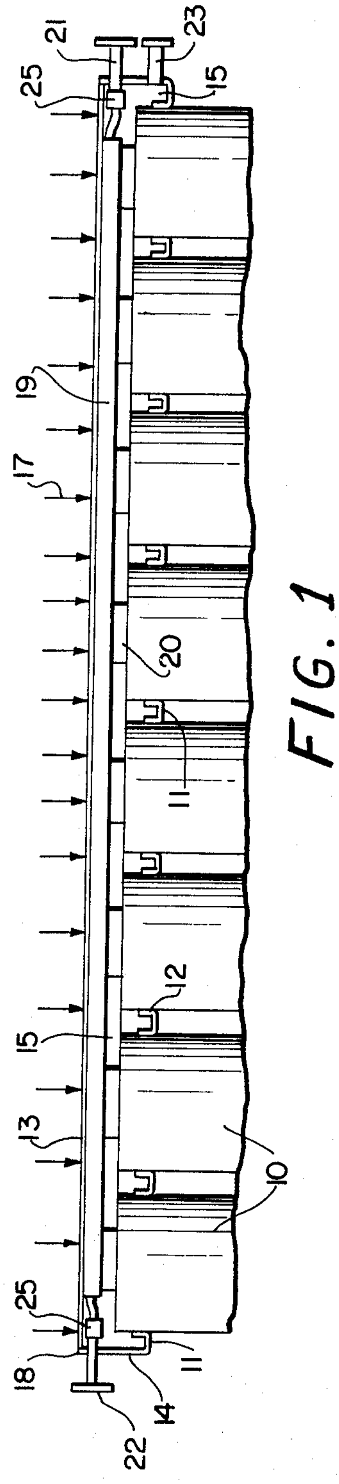
FIG. 1 is a partial side elevational view illustrating a centrifuge block with covering hood according to a first embodiment of the invention.

FIG. 1 illustrates schematically a number of centrifuges of a centrifuge block arranged in respective housings 10. At its upper end, the centrifuge block is held together by means of a plate 11 provided with holes rimmed with annularly cylindrical collars 12 to accomodate the housings 10. At its free end, each collar 12 is welded to the respective housing 10 such that no communication remains between the intermediate spaces above and below the plate 11. At its outer rims, the plate 11 is raised and covered with a flat hood 13, the edges of which are welded or otherwise sealingly joined to the side wall 14.

When a centrifuge block is placed in operation, the various centrifuges are evacuated, as is the space 15 formed above the plate 11 and enclosed by the hood 13. Arranged within this space 15 are all connections and gas ducts needed for feeding and extracting the process gas. This provides an advantage in that the necessary connections and seals are made within the space enclosed by hood 13 under conditions where there is little difference in pressure and where there are similar gas atmospheres, thereby reducing assembly and sealing problems. More particularly, however, such an arrangement will provide added safety. Full or partial evacuation of the space 15 causes the atmospheric pressure 17 to act on the hood 13, and this pressure can now additionally be utilized to urge the various components together, at least in the sealing areas. This can be turned to advantage for sealing the joint 18 between the hood 13 and the wall portion 14, as well as for urging the process gas ducts 19 against the connecting openings 20 of the centrifuges. Provided also are collector connections 21 to 23 serving to feed and extract the process gas to or from the centrifuge block, respectively.

The process gas can be ducted in a number of different ways. Use can be made, for example, of process tubes 19 of rectangular cross-section as shown in the embodiment of FIG. 3. Such tubes are disposed in parallel to one another on the respective rows of centrifuges so as to issue into transversely directed collector ducts 25. It is equally practical to use serpentine process tubes 30 as shown in the plan view of a centrifuge block in FIG. 2, thereby eliminating the need for the collector ducts 25 of FIG. 1.

In each case, tubes 19 or 30 are used to duct the gas fractions, while the feed gas is admitted through the remaining space 15 enclosed by the hood 13. During assembly, the process gas tubes are located on the centrifuges and secured in position at several places using bolts or other fasteners 33, as shown in FIG. 3. These tubes are pressed against the respective centrifuge covers by the flat hood 13, the hood 13 being placed on the tubes directly, or having an intermediate member 34 as shown in FIG. 3.

Figure 2:
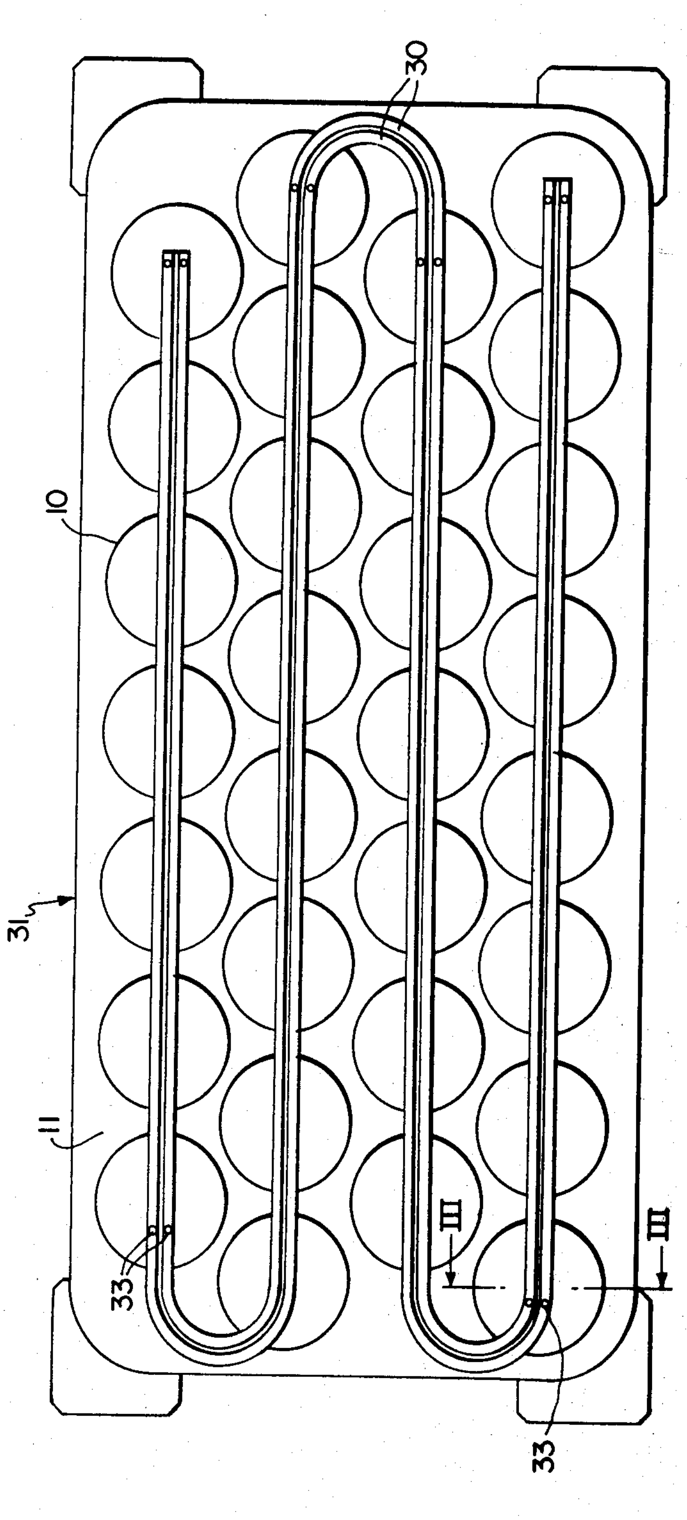
FIG. 2 is a plan view illustrating a centrifuge block fitted with serpentine process gas ducts according to a second embodiment of the invention.
Figure 3:
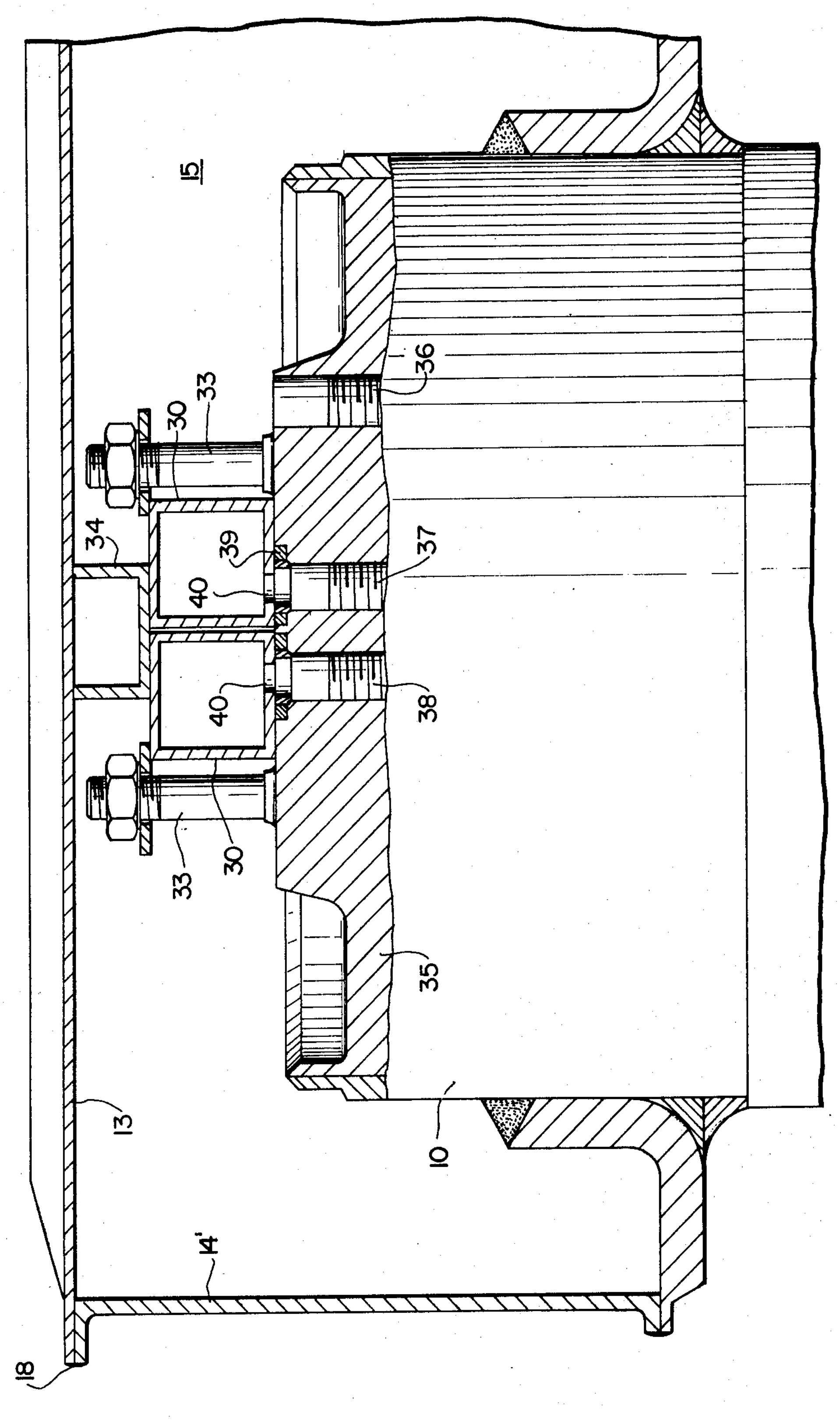
FIG. 3 is a partial cross-sectional view taken along lines III—III of FIG. 2.

FIG. 3 is an expanded, partial cross-sectional view taken at line III—III of FIG. 2, illustrating the upper portion of a centrifuge housing 10. The housing 10 is sealed at its upper end by means of a cover 35 having ports 36 for feeding or extracting process gas. The ports 37 and 38 issue through respective openings 40 into a process gas tube 30. The tubes 30 held in place on the cover 35 by means of the bolts 33 are urged, through the intermediate member 34, by the hood 13 towards sealing rings 39 such that the resulting gas ducts for the gas fractions are adequately sealed from the space 15.

It is also feasible to weld or otherwise join the process tubes 30 to the inside of the hood 13. The tubes being located directly in this manner, assembly of the gas ducting device is thus reduced to placing the integrated process gas ducting unit on the centrifuge block and welding the hood 13 to the wall 14'.

Figure 4:
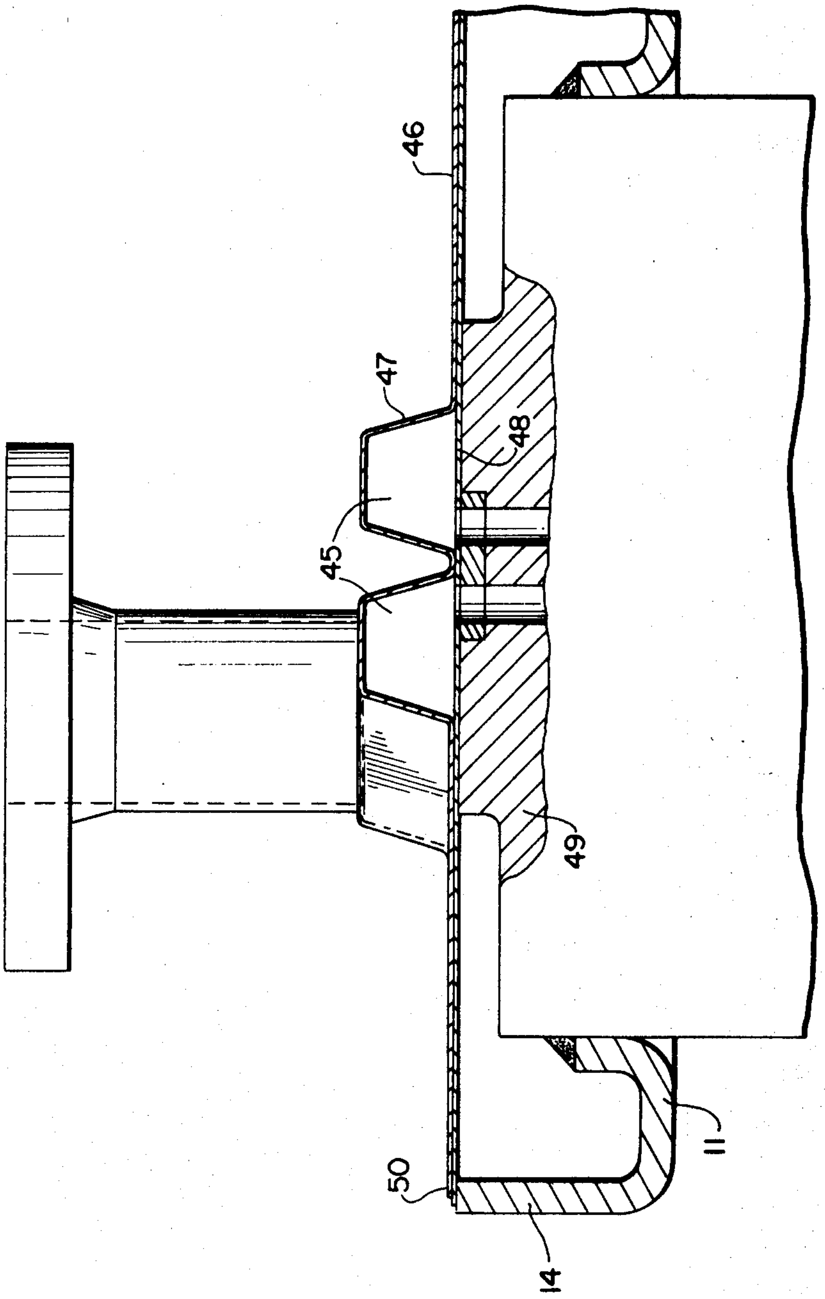
FIG. 4 is a partial cross-sectional view, similar to FIG. 3, of a third embodiment of the invention.

With reference now to the embodiment represented in FIG. 4, the gas ducts 45 are formed directly by the hood 46, where channel sections 47 and a plate 48 are used to form the flow ducts in a very simple manner. In this case, the plate 48 rests directly on the centrifuge cover 49, while the hood 46 rests on this plate and is welded or otherwise joined at its rims 50 for good sealing to the wall 14.

Figure 5:
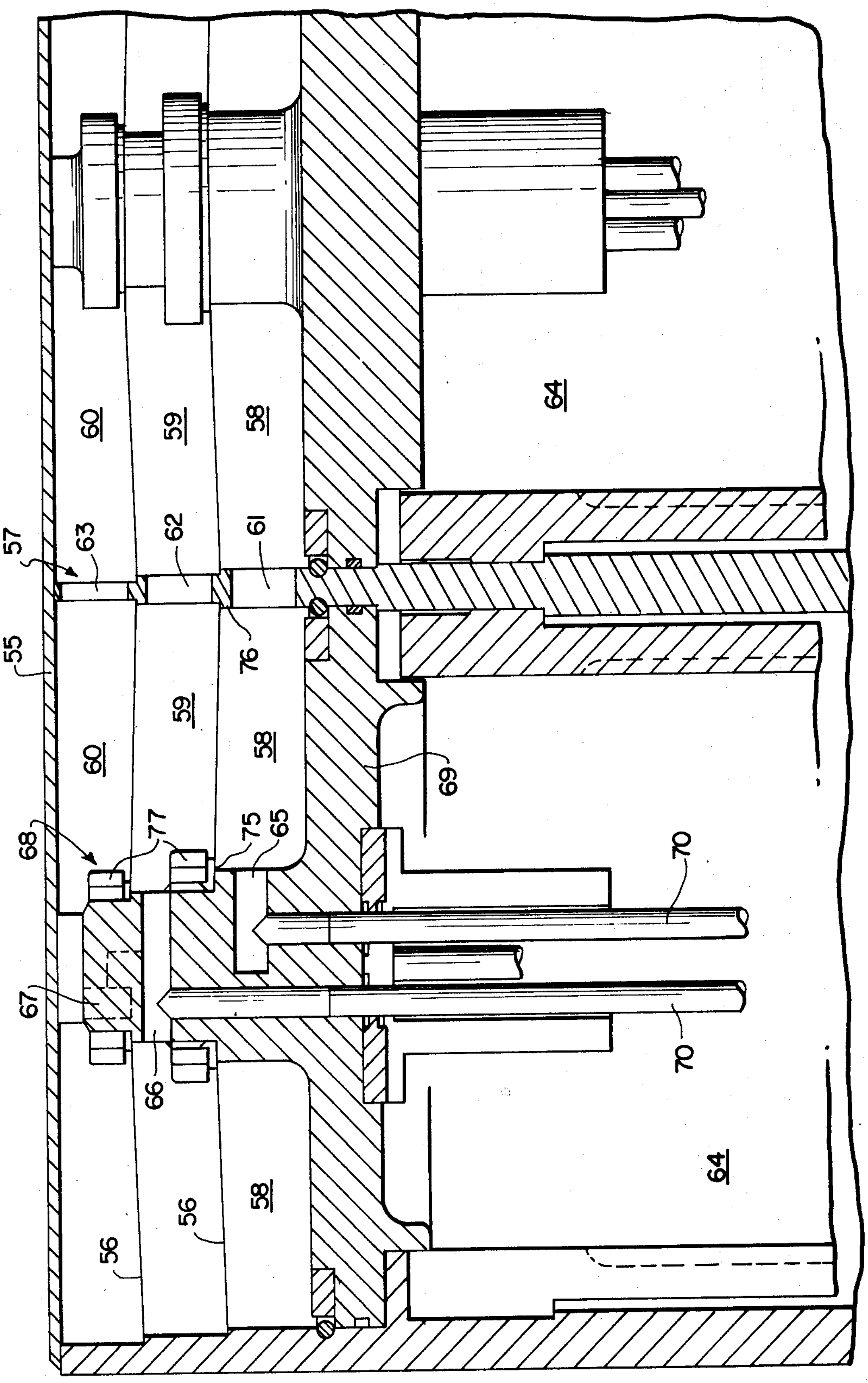
FIG. 5 is a partial cross-sectional view of a centrifuge block and process gas ducting arrangement according to still another embodiment of the invention.

FIG. 5 illustrates another manner of forming process gas flow ducts. In this case, the space enclosed under the hood 55 is partitioned by annular plates 56 and walls 57 (the latter forming part of the centrifuge housing) extending normally to the hood 55 into annular chambers 58 to 60. The annular chambers 58 to 60 of adjacent centrifuges communicate with one another through ports 61 to 63 in walls 57. Communication of these annular chambers with the separation chambers 64 of the centrifuges is established via bores 65 to 67 in a connecting member 68, these bores leading through the cover 69 and issuing into process gas tubes 70. Partitioning members 56 may be machined washer-like members, pressed sheet washers or cup-springs resting on suitably formed shoulders 75, 76 of the connecting tube 68 and of wall 57 and being secured by means of slotted nuts 77 or other suitable fasteners. Communication of the centrifuges with the process gas collector connections is preferably made at the rim of the block or from the block hood.

What is claimed is:

1. A centrifuge block having upper and lower ends and including a plurality of centrifuge housings for a plurality of centrifuges, each centrifuge having a separating chamber with respect to which process gas may flow during use, the centrifuge block comprising:

a plate at said upper end for holding said centrifuge housings, said plate having a plurality of holes for sealingly accommodating said centrifuge housings;

each housing including a cover, each cover being provided with connecting openings for carrying process gas;

each centrifuge having tubes communicating therewith for carrying the process gas, each tube extending from the separating chamber of its associated centrifuge to a connecting opening of its associated cover;

hood means sealingly covering the plurality of centrifuges, said hood means, together with said plate, defining an enclosed space;

said space forming a first duct for the process gas;

said hood means including channel sections forming remaining ducts for the process gas, said channel sections being disposed within said space;

said first and remaining ducts being in communication with said connecting openings.

2. The centrifuge block of claim 1, wherein said at least one tube comprises a serpentine tube in communication with all said centrifuge housings of said block for ducting said process gas.

3. The centrifuge block of claim 1, wherein said at least one tube is rectangular in cross-section.

4. The centrifuge block of claim 2, wherein said at least one tube is rectangular in cross-section.

5. The centrifuge block of claim 1, wherein said hood at least partially encloses a space, further comprising partitioning walls dividing said space into a plurality of chambers, said chambers comprising said first and remaining ducts for said process gas.

6. The centrifuge block of claim 1, wherein the centrifuge block comprises said first duct and a remaining portion other than said first duct; wherein said first duct is evacuated to below atmospheric pressure; and including means for sealingly urging said first duct against said remaining portion of said centrifuge block by atmospheric pressure upon evacuation of said first duct.

* * * * *